United States Patent
Tadepalli

(10) Patent No.: US 6,462,901 B1
(45) Date of Patent: Oct. 8, 2002

(54) RIBBED SHROUDING SPACER AND METHOD FOR REDUCING FLUTTER AND WINDAGE LOSSES IN DISC DRIVES

(75) Inventor: Srinivas Tadepalli, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/510,093

(22) Filed: Feb. 22, 2000

Related U.S. Application Data

(60) Provisional application No. 60/121,139, filed on Feb. 22, 1999.

(51) Int. Cl.[7] ................................................ G11B 33/14
(52) U.S. Cl. .................................................. 360/97.03
(58) Field of Search ........................... 360/97.02, 97.03

(56) References Cited

U.S. PATENT DOCUMENTS

| | | | | |
|---|---|---|---|---|
| 4,821,130 A | * | 4/1989 | Bernett et al. ........... | 360/78.04 |
| 5,031,059 A | * | 7/1991 | Yamaguchi et al. ...... | 360/97.03 |
| 5,517,372 A | * | 5/1996 | Shibuya et al. .......... | 360/97.02 |
| 5,696,649 A | * | 12/1997 | Boutaghou ............... | 360/97.03 |
| 6,125,003 A | * | 9/2000 | Tsuda et al. ............. | 360/97.03 |
| 6,229,304 B1 | * | 5/2001 | Guzik ..................... | 360/97.03 |
| 6,239,943 B1 | * | 5/2001 | Jennings et al. ......... | 360/97.02 |

FOREIGN PATENT DOCUMENTS

| JP | 7-14360 | * | 1/1995 |
|---|---|---|---|

\* cited by examiner

*Primary Examiner*—Jefferson Evans
(74) *Attorney, Agent, or Firm*—Derek Berger

(57) ABSTRACT

A method and apparatus is described for reducing flutter and windage losses in disc drives. In one embodiment, a ribbed shroud is provided at the circumference of the disc assembly. One such disc-drive system includes a disc-drive housing, at least one disc mounted within the housing which rotates, a transducer having a read head positionable to read data from the disc, and a shroud structure near an outer circumference of the disc that reduces flutter and windage losses. In some embodiments, the shroud structure is ribbed. Also presented is a first method for reducing flutter and windage losses in a disc drive, including spacing a first shroud at each one of at least two different spacings from an outer-diameter edge of one or more discs within the disc drive, measuring a performance characteristic of the disc drive at each one of the at least two different spacings, and selecting one of the shroud spacings based on the measuring step.

15 Claims, 8 Drawing Sheets

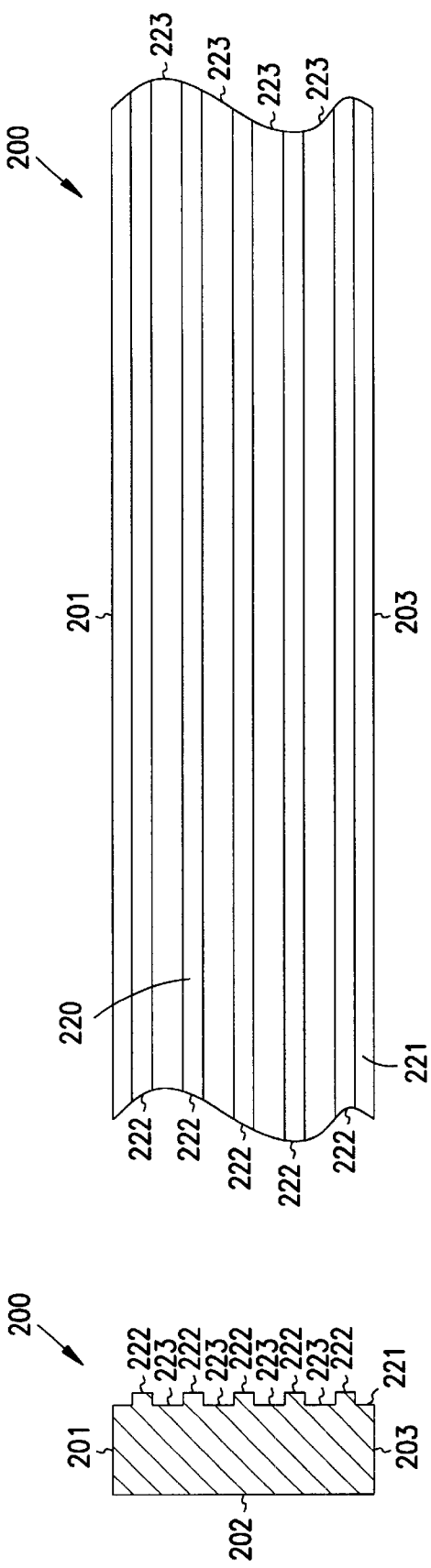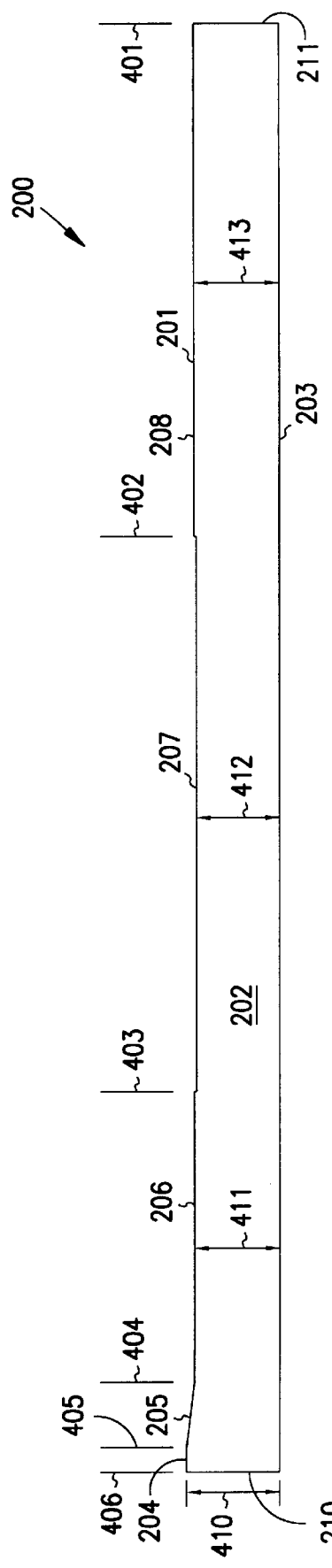

RIBBED SHROUDING SPACER AND METHOD FOR REDUCING FLUTTER AND WINDAGE LOSSES IN DISC DRIVES

RELATED APPLICATIONS

This application claims the benefit under 35 U.S.C. 119(e) of U.S. Provisional Application Ser. No. 60/121,139 filed Feb. 22, 1999.

FIELD OF THE INVENTION

The present invention relates to the field of mass-storage devices. More particularly, this invention relates to a method and ribbed shrouding spacer for flutter and windage losses reduction in 3.5" form factor disc drives.

BACKGROUND OF THE INVENTION

Devices that store data are key components of any computer system. Computer systems have many different types of devices where data can be stored. One common device for storing massive amounts of computer data is a disc drive. The basic parts of a disc drive are a disc assembly having at least one disc that is rotated, an actuator that moves a transducer to various locations over the rotating disc, and circuitry that is used to write and/or read data to and from the disc via the transducer. The disc drive also includes circuitry for encoding data so that it can be successfully retrieved from and written to the disc surface. A microprocessor controls most of the operations of the disc drive, in addition to passing the data back to the requesting computer and receiving data from a requesting computer for storing to the disc.

The disc drive includes a transducer head for writing data onto circular or spiral tracks in a magnetic layer the disc surfaces and for reading the data from the magnetic layer.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so that the slider flies over the surface of the disc at a particular desired fly height. The air lubrication film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. Servo feedback information is used to accurately locate the transducer. The actuator assembly is moved to the required position and held very accurately during a read or write operation using the servo information.

When the disc assembly is rotated at high speed, the air adjacent to the spinning disc or discs is caused to move as well. This moving air moves between the rotating disc and the read/write transducer, creating an air bearing, and advantageously causing the transducer to "fly" over the disc surface. This moving air is thus a desirable feature of the disc drive.

The moving air from the disc or discs, as it passes by the transducer arm or arms and the fixed structures surrounding the disc assembly, also causes undesirable vibrations and windage losses in the disc drive, due to turbulence and/or friction. The flow disturbances/perturbations cause the disc (s) and/or transducers and transducer arms to vibrate, making precision tracking operations difficult. Windage losses cause more power to be consumed in rotating the disc(s). The windage losses and vibration increase dramatically with an increase in the speed of rotation of the discs in the disc drive. Currently, discs are rotated at 10,000–15,000 revolutions per minute in high performance disc drives. It is anticipated that rotational speeds will continue to climb in future products which will further magnify the problem. In addition, track density or the number of tracks per inch is also anticipated to increase since three is continued pressure to add capacity to disc drives. With thinner tracks, vibrations become more of a problem since tracking is also more difficult.

There is, therefore, a need for a method and structure for reducing flutter and windage losses in disc drives. There is also a need for a method and apparatus that will lessen vibration due to windage so that even more precise tracking can be accomplished.

SUMMARY OF THE INVENTION

A method and apparatus is described for reducing flutter and windage losses in disc drives. In one embodiment, a ribbed shroud is provided at the circumference of the disc assembly.

One aspect of the present invention provides a disc-drive system that includes a disc-drive housing, at least one disc mounted within the housing which rotates, a transducer having a read head positionable to read data from the disc, and a shroud structure near an outer circumference of the disc that reduces flutter and windage losses. In some embodiments, the shroud structure is ribbed.

Another aspect of the present invention provides a shroud structure for reducing flutter and windage losses in a disc drive. The structure includes a cylindrical section at a substantially constant first radius from an axis of the disc, the cylindrical section having one or more raised circumferential ribs depending on the number of discs, each having a top portion at a substantially constant second radius from the axis of the disc, the second radius being smaller than the first radius.

The present invention also provides a method for reducing flutter and windage losses in a disc drive. The method includes spacing a first shroud at each one of at least two different spacings from an outer-diameter edge of one or more discs within the disc drive. A performance characteristic of the disc drive is measured at each one of the at least two different spacings. The shroud spacings having the best performance characteristic is then selected.

In some embodiments, the performance characteristic measured by measuring step is spindle-motor current and in others the performance characteristic is off track read errors.

The present invention also includes a method for reducing flutter and windage losses in a disc drive. The method includes forming a ribbed structure spaced from and oriented opposite an outer-diameter edge of one or more discs within the disc drive. The ribs of the ribbed structure are oriented along a direction of rotation of the one or more discs.

BRIEF DESCRIPTION OF THE DRAWINGS

FIG. 2 is a cross-section elevation diagram of a ribbed shroud 200 incorporating ribs 222 according to one embodiment of the present invention.

FIG. 3 is an elevation-view diagram showing a portion of the inside surface of ribbed shroud 200.

FIG. 4 is an elevation-flattened-view diagram showing the outside surface of ribbed shroud 200.

DESCRIPTION OF THE PREFERRED EMBODIMENT

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

High-performance disk drives require high spindle rotation speeds in order to achieve lower access times (i.e., in particular, the contribution to access time due to rotational latency). The spindle and one or more discs, together called the "disc assembly," are rotated by the spindle motor. As spindle speed increases, the power consumed increases as a result. A portion of the increased power is due to windage losses (i.e., the rotating spindle and disc cause air within the disc housing to rotate, producing a "wind" rotating within the housing that is associated with power used in the spindle motor). In addition, air-flow disturbances or turbulence cause disc vibration (i.e., flow-induced flutter). Such disc flutter is primarily induced by air-flow disturbances, but can have other input factors as well. In some embodiments, certain frequencies of the flutter are amplified by the disc-drive servo system. In some embodiments, increased spindle speeds increase flutter (or at least increase the negative effects of flutter) and thus form an increasing component of track mis-registration. In turn, this affects raw read-write reliability at high track densities, thus causing more frequent error-correction procedures.

The present invention provides a shroud and/or a shroud-like structure in the housing to reduce windage losses as well as flutter. In one embodiment, experiments are run with each disc-drive configuration to determine an optimal shroud size, cross-sectional shape, shroud-to-disc spacing, and other factors. An optimal configuration of the shroud is then empirically derived by measuring disc windage losses and flutter characteristics with various shroud configurations.

The invention described in this application is useful for all types of disc drives, including hard-disc drives, ZIP drives, floppy-disc drives, and any other type of drives, systems of drives (such as a "redundant array of inexpensive/independent disc drives," or RAID, configuration) or other devices, where a disc assembly is rotated within a housing.

Figure 1:
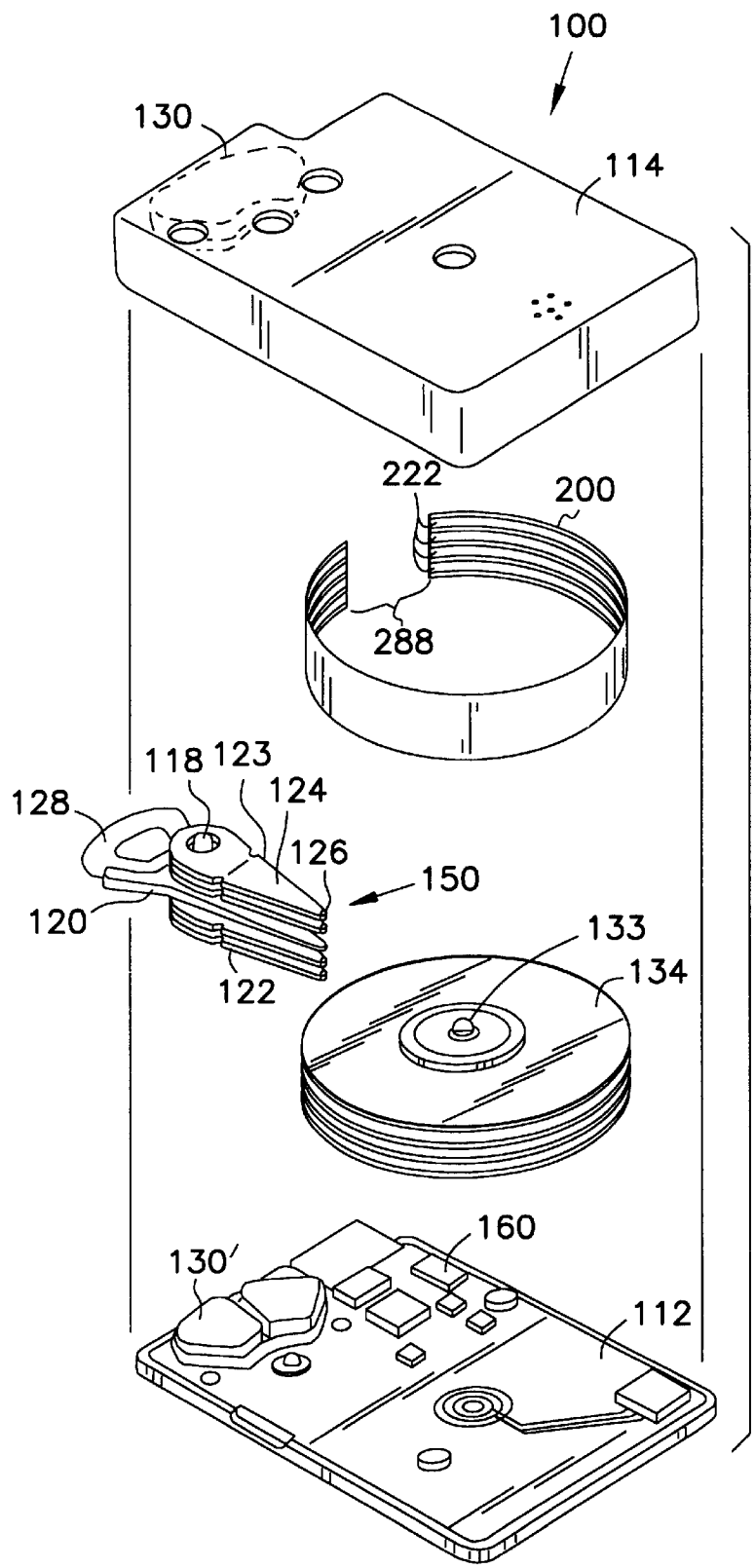
FIG. 1 is an exploded view of a disc drive with a multiple disc stack and a ribbed shroud 200 surrounding the edges of the discs.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention, this embodiment showing one type of a disc drive 100 having a rotary actuator. The disc drive 100 includes a housing formed of base 112 and cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a electromagnetic coil write head 97 and a magneto-resistive read head 98 (see FIG. 2, below). The slider 126 with the transducer 150 form what is many times called the head. It should be noted that many sliders have one transducer 150 and that is what is shown in the figures. It should also be noted that this invention is equally applicable to sliders having more than one transducer, such as what is referred to as a MR or giant magneto-resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 130'. As shown in FIG. 1, the second magnet 130' is associated with the cover 114. The first and second magnets 130, 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called spindle hub 133. In this particular disc drive, the spindle motor is within hub 133. In FIG. 1, a number of discs 134 (one or more; four are shown) are attached to the spindle hub 133 to form disc assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

According to one embodiment of the present invention, a shroud spacer 200 is provided at the outer circumference of disc assembly 132 to reduce flow disruption and streamline the peripheral flow. A gap 288 in the shroud is provided to allow access for transducer arm 124 to disc assembly 132. In some embodiments, gap 288 and/or one or more other gaps are provided for a recirculation filter, access for tools used to balance the disc pack, and/or air-flow bleeding to cool the voice coil (since the voice coil is heated by current flow used for seek operations).

FIG. 2 is a cross-section elevation diagram of one embodiment of a ribbed shroud 200 incorporating a plurality of circumferential ribs 222, circumferential recessed spaces 223 between each pair of ribs 222, a top edge 201, bottom edge 202, outer face 202 and inner face 221. In some embodiments, inner face 221 is formed to be placed in the disc housing formed by base 112 and cover 114 at a substantially constant radius from the rotation axis of disc(s) 134, but with raised ribs 222 at a smaller radius than circumferential recessed spaces 223 (for example, by about 12 mils). In this embodiment, the raised ribs are thus said to have a height of about 12 mils. In some embodiments, the tops of the raised ribs are oriented next to the outer diameter of respective ones of discs 134. In one embodiment, the discs 134 are each about 31.5 mils thick, and each rib is about 41.5 mils wide (and thus about 10 mils wider than the thickness of the disc), and is centered adjacent to and spaced from its corresponding disc, such that about 5 mils of the rib extends "above" its corresponding disc and about 5 mils of the rib extends "below" its corresponding disc. In this embodiment, each recessed spacing 223 is about 64 mils wide, and thus the ribs 222 are 105.5 mils center-to-center.

FIG. 3 is an elevation-view diagram showing a portion of the inside surface of ribbed shroud 200.

FIG. 4 is an elevation-flattened-view diagram showing the outside surface of ribbed shroud 200. In one embodiment, the upper edge 201 is formed at a number of different elevations, including a section 208 (546 mils wide) starting at point 401 at end 211 of shroud 200 and extending to point 402 (at 3.319 inches from point 401), a section 207 (531 mils wide) starting at point 402 of shroud 200 and extending to point 403 (at 6.934 inches from point 401), a section 206 (546 mils wide) starting at point 403 of shroud 200 and extending to point 404 (at 8.815 inches from point 401), a section 205 (ramping from 546 mils wide to 596 mils wide) starting at point 404 of shroud 200 and extending to point 405 (at 9.236 inches from point 401), and a section 204 (596 mils wide) starting at point 405 of shroud 200 and extending to end point 406 (at 9.390 inches from point 401). In some embodiments, the wider area 204 and ramped area 205 provide an extra air collection area as the rotating air begins its circuit around the inside of shroud 200.

Figure 5:
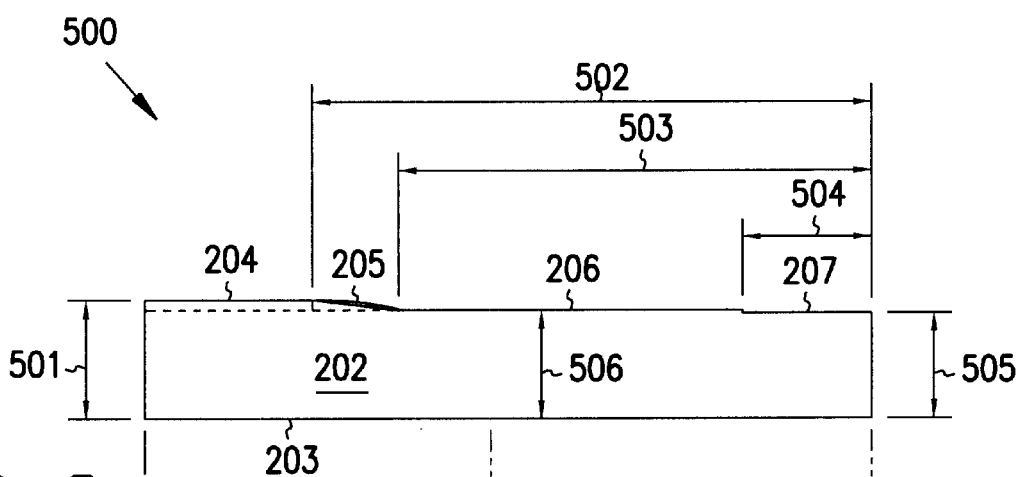
FIG. 5 is an elevation-view diagram showing the outside surface of ribbed shroud 200 in its circular configuration.

FIG. 5 is an elevation-view diagram showing the outside surface of ribbed shroud 200 in its circular configuration that will be inserted into disc drive 100. Section 207 extends distance 504 (about 0.610 inches) from the right-hand side tangent of the circular shroud 200. Distance 503 (about 2.355 inches) is to the start of ramped section 205. Distance 504 (about 2.788 inches) is to the top of ramped section 205. Height 501 (about 0.596 inches) is to the top of section 204. Height 505 (about 0.531 inches) is to the top of section 207. Height 506 (about 0.546 inches) is to the top of section 206 and section 208.

Figure 6:
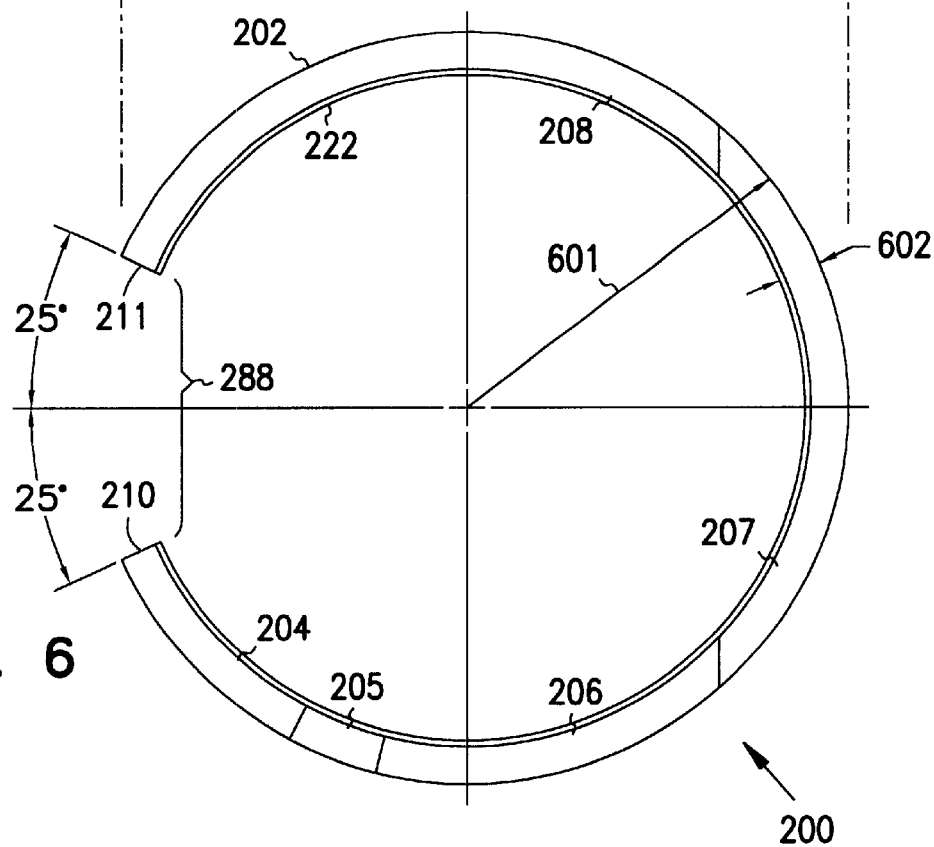
FIG. 6 is a plan-view diagram showing the outside surface of ribbed shroud 200 in its circular configuration.

FIG. 6 is a plan-view diagram showing the outside surface of ribbed shroud 200 in its circular configuration (the same configuration as FIG. 5). Opening 288 subtends an angle of about 50 degrees. Radius 601 from the axis of discs 134 to the outer face of shroud 200 is about 1.895 inches, in one embodiment. In this embodiment, thickness 602 is about 185 mils.

Figure 7:
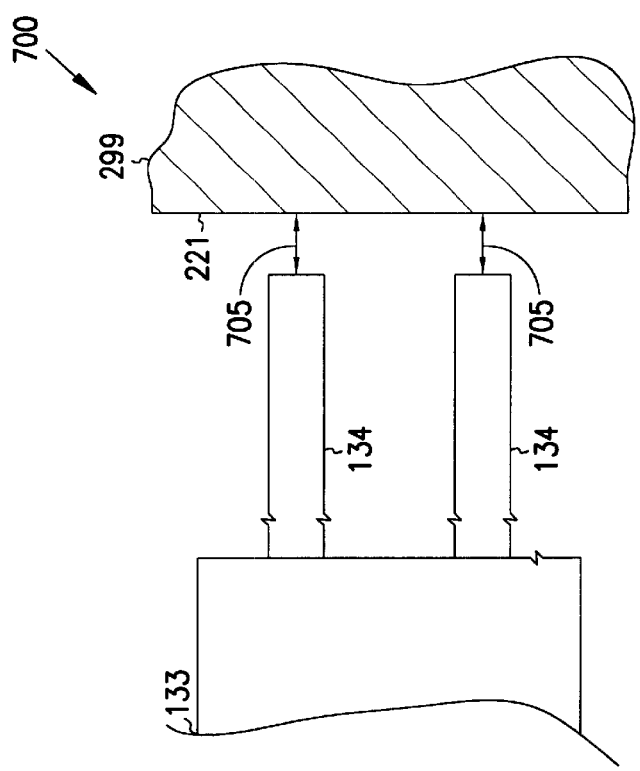
FIG. 7 is an elevation-view diagram showing a portion of discs 134 surrounded by the inside surface of a flat-walled shroud 299.

FIG. 7 is an elevation-view diagram showing a portion of discs 134 surrounded by the inside surface of a flat-walled shroud 299. This side-view cross-sectional diagram shows a portion of a disc drive 700 that uses a constant shroud 299 (i.e., shroud 299 has a flat interior wall 221 that is at a constant or substantially constant radius R from the axis of spindle hub 133). In one embodiment, the shroud clearance 705 is varied (e.g., from 15 mils to 55 mils, where one mil is 0.001 inch which equals 0.00254 cm) and measurements of spindle motor current are made at various clearance spacings.

Figure 9:
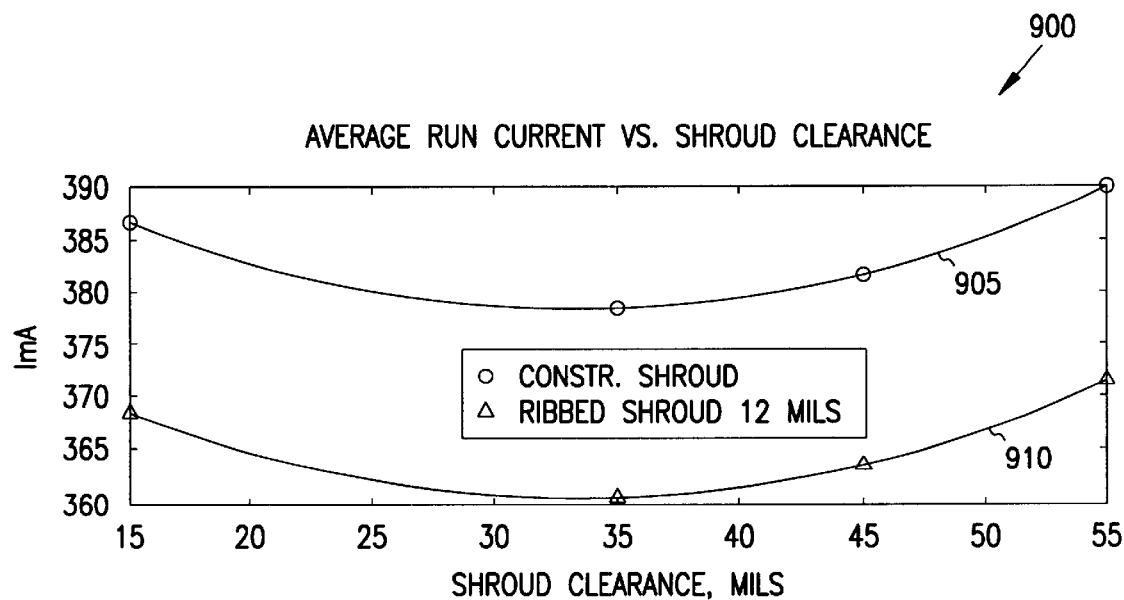
FIG. 9 is a graph showing disc-motor current as a function of shroud clearance to ribbed shroud 200 and flat-walled shroud 299.

FIG. 9 is a graph showing disc-motor current as a function of shroud clearance to ribbed shroud 200 (curve 910) and flat-walled shroud 299 (curve 905). The results from one such experiment are estimated by curve 905 which is fit to measured values, wherein the ○ (circle) symbols on curve 905 show the actual current measurements at the various clearance spacings 705. From these results, an optimal shroud clearance distance 705 is derived to minimize or reduce power dissipation. In one embodiment, a shroud clearance distance 705 of about 35 mils provides minimum or reduced spindle motor current, and this clearance is implemented with a flat-walled shroud 299 in order to reduce spindle motor current, and thus reduce drive power dissipation. In other embodiments using flat shroud 299, shroud clearance values 705 between about 30 mils and 35 mils are used. In yet other embodiments, shroud clearance values 705 between about 30 mils and about 35 mils are used. In yet other embodiments, shroud clearance values 705 between about 25 mils and about 40 mils are used. In yet other embodiments, shroud clearance values 705 between about 20 mils and about 45 mils are used.

Figure 8:
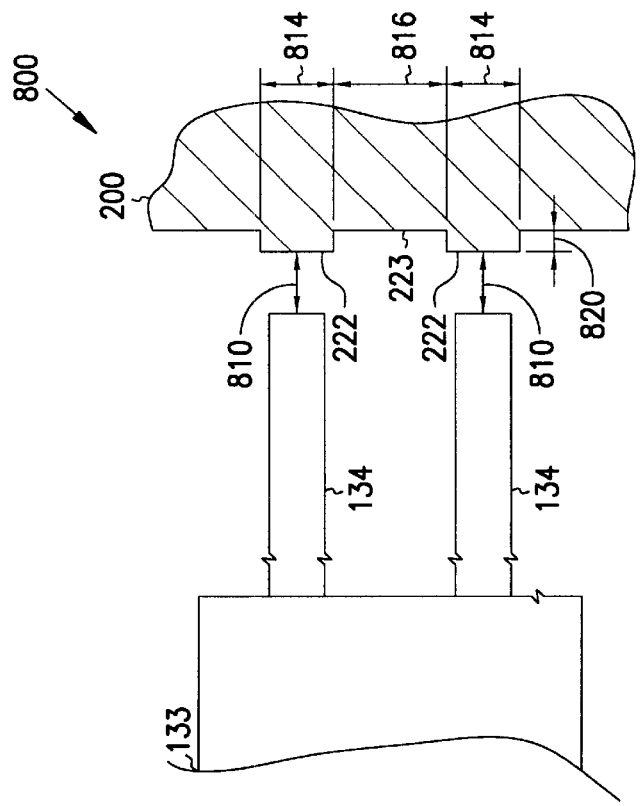
FIG. 8 is an elevation-view diagram showing a portion of discs 134 surrounded by the inside surface of a ribbed shroud 200.

FIG. 8 is an elevation-view diagram showing a portion of discs 134 surrounded by the inside surface of a ribbed shroud 200. Curve 910 of FIG. 9 is fit to measured clearance values using a ribbed shroud having 12-mil rib heights, wherein the Δ (delta) symbols on curve 910 show the actual current measurements at the various clearance spacings 810. In one embodiment, a shroud clearance distance 810 of about 35 mils provides minimum or reduced spindle motor current, and this clearance is implemented with a ribbed shroud 200 in order to reduce spindle motor current, and thus reduce drive power dissipation. In other embodiments using ribbed shroud 200, shroud clearance values 810 between about 30 mils and 35 mils are used. In yet other embodiments, shroud clearance values 810 between about 30 mils and about 35 mils are used. In yet other embodiments, shroud clearance values 810 between about 25 mils and about 40 mils are used. In yet other embodiments, shroud clearance values 810 between about 20 mils and about 45 mils are used.

Figure 10:
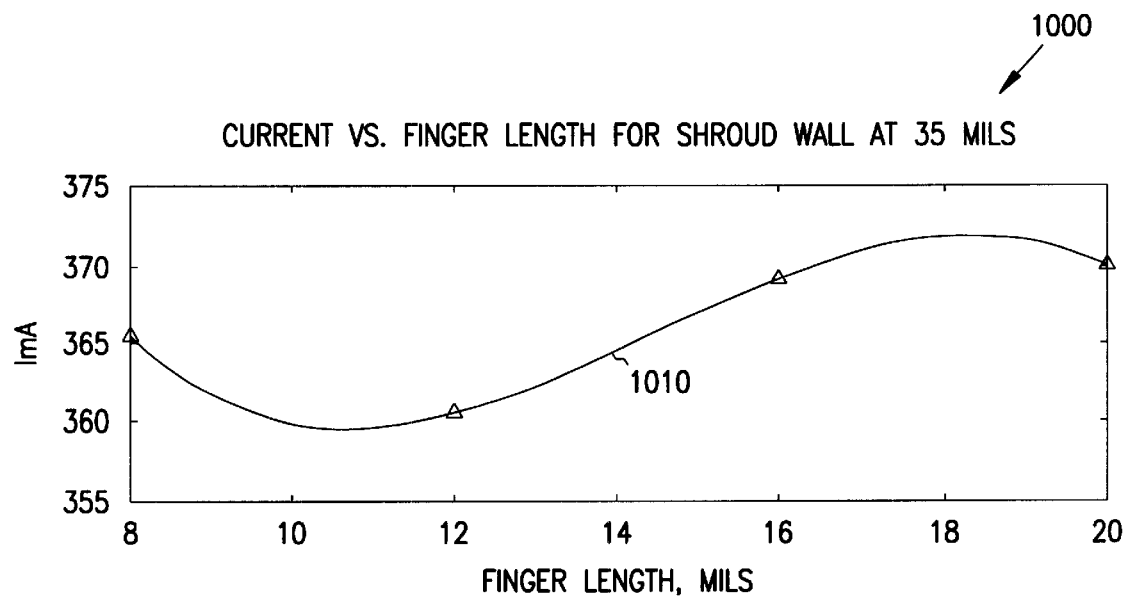
FIG. 10 is a graph showing disc-motor current as a function of the rib height of ribbed shroud 200.

FIG. 10 is a graph showing disc-motor current as a function of the rib height of ribbed shroud 200. Curve 1010 of FIG. 10 is fit to measured clearance values using a ribbed shroud having various rib heights, wherein the Δ (delta) symbols on curve 910 show the actual motor-current measurements at the various rib-height values 820. In one embodiment, a rib-height value 820 of about 12 mils provides minimum or reduced spindle motor current, and this rib-height value 820 e is implemented on ribbed shroud 200 in order to reduce spindle motor current, and thus reduce drive power dissipation. In other embodiments using ribbed shroud 200, a rib-height value 820 between about 10 mils and 12 mils is used. In yet other embodiments, a rib-height value 820 between about 8 mils and about 14 mils is used. In yet other embodiments, a rib-height value 820 between about 7 mils and about 14 mils is used. In yet other embodiments, a rib-height value 820 between about 6 mils and about 16 mils is used.

In some embodiments, further variables are optimized, for example: the shape of the sidewalls of ribs 222, the shape of the tops of ribs 222, the width of the tops of ribs 222 and the width of the recessed space 223 between ribs, and the shape of the bottom of recessed space 223 between ribs. In some such embodiments, one or more of the above variables (including those of FIGS. 7–10) are varied one at a time, and the resultant effect on windage losses (for example, as measured by the disc-motor current) and/or flutter (for example, as measured by reflecting a laser beam off of a disc 134 or off of a transducer 126 and measuring deflection caused by flutter).

In other alternative embodiments, raised ribs 222 are placed between discs 134 (or adjacent the spacing between discs 134), and the recessed space 223 between each rib is adjacent to the outer circumference edge of the discs 134.

Figure 11:
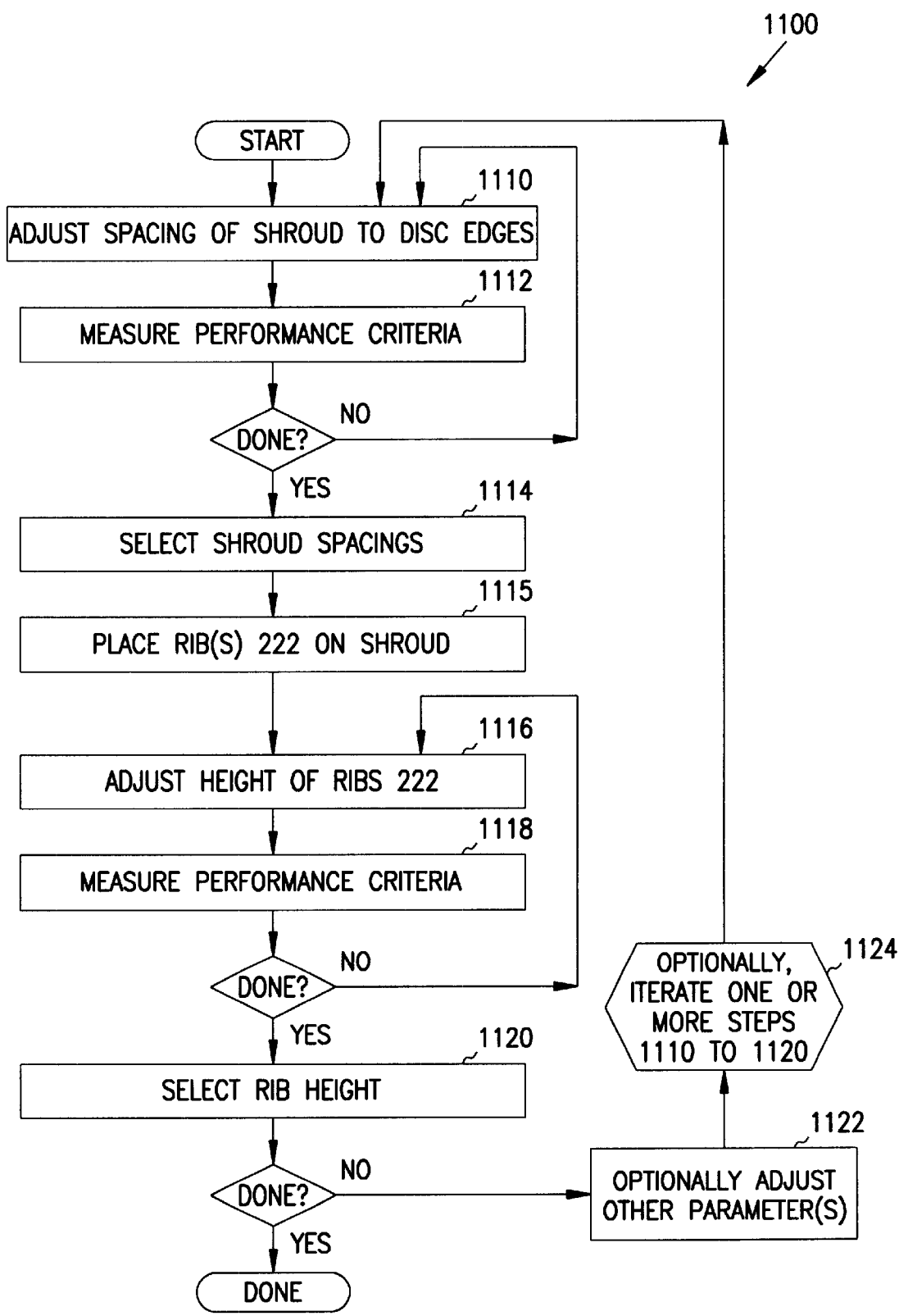
FIG. 11 is flowchart of determining optimal shroud clearance and rib height for one embodiment of the present invention.

FIG. 11 is flowchart of determining optimal shroud clearance and rib height for one embodiment of the present invention. This first method 1100 for reducing flutter and windage losses in a disc drive, includes block 1110 spacing a first shroud at each one of at least two different spacings from an outer-diameter edge of one or more discs within the disc drive, block 1112 measuring a performance characteristic of the disc drive at each one of the at least two different spacings, and 1114 selecting one of the shroud spacings based on the measuring step 1112.

Some embodiments of the first method further include a step of 1115 providing at least one raised rib circumferentially oriented on an inner face of the first shroud.

In some embodiments of the first method, the providing step 1115 further includes positioning the raised rib opposite an outer-diameter edge a corresponding one of the one or more discs.

Some embodiments of the first method further include steps of 1116 providing a second shroud having at least one raised rib circumferentially oriented on an inner face of the second shroud and having a different height than that of the at least one raised rib of the first shroud, 1118 measuring a performance characteristic of the disc drive when fitted with the first shroud and when fitted with the second shroud, and 1120 selecting one of the rib heights based on the measuring step 1118.

In some embodiments of the first method, the performance characteristic measured by measuring step 1118 is disc-motor current (see curve 1010 of FIG. 10).

In some embodiments of the first method, the performance characteristic measured by measuring step 1112 is disc-motor current (see curves 905 and 910 of FIG. 9). Another performance characteristic is disc vibration such as axial non-repeatable runout. This is typically measured by laser doppler vibrometer (LDV). A laser beam is focused at the outer edge of the disc.

Figure 12:
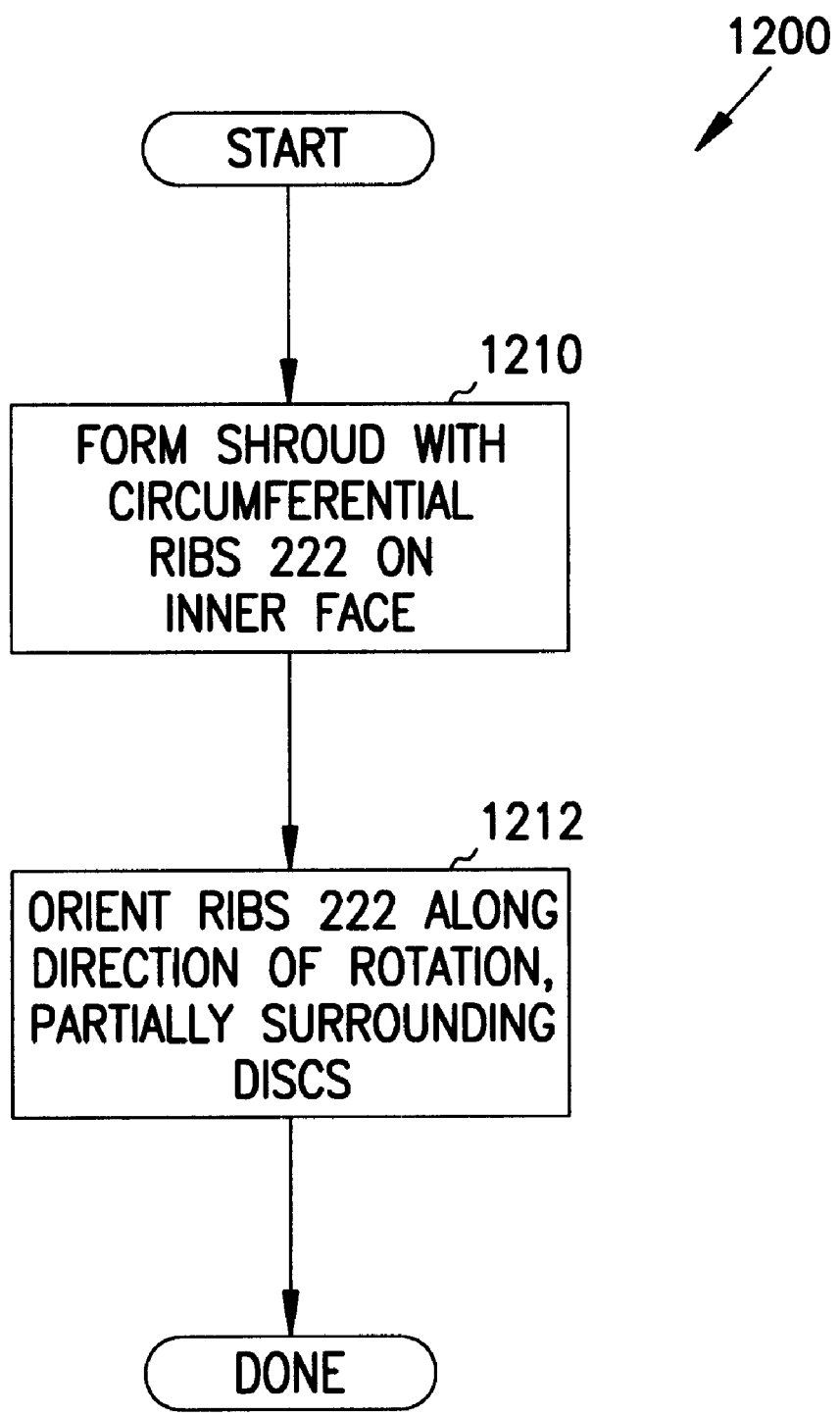
FIG. 12 is a flowchart of a method of forming and orienting a shroud with ribs.

FIG. 12 is flowchart reducing flutter and windage losses in a disc drive according to one embodiment of the present invention. This second method 1200 includes steps of 1210 forming a ribbed structure that is oriented spaced from and opposite an outer-diameter edge of one or more discs within the disc drive, and 1212 orienting one or more ribs of the ribbed structure along a direction of rotation of the one or more discs.

In some embodiments of the second method, the orienting step 1212 includes orienting tops of the one or more ribs of the ribbed structure adjacent to and spaced radially from the outer-diameter edge of the one or more discs, and orienting one or more recesses next to the ribs spaced in an axial direction from the outer-diameter edge of the one or more discs. In some embodiments, the ribbed shroud partially surrounds discs 134, leaving a gap 288 for the access of discs 134 by transducer 150.

Figure 13:
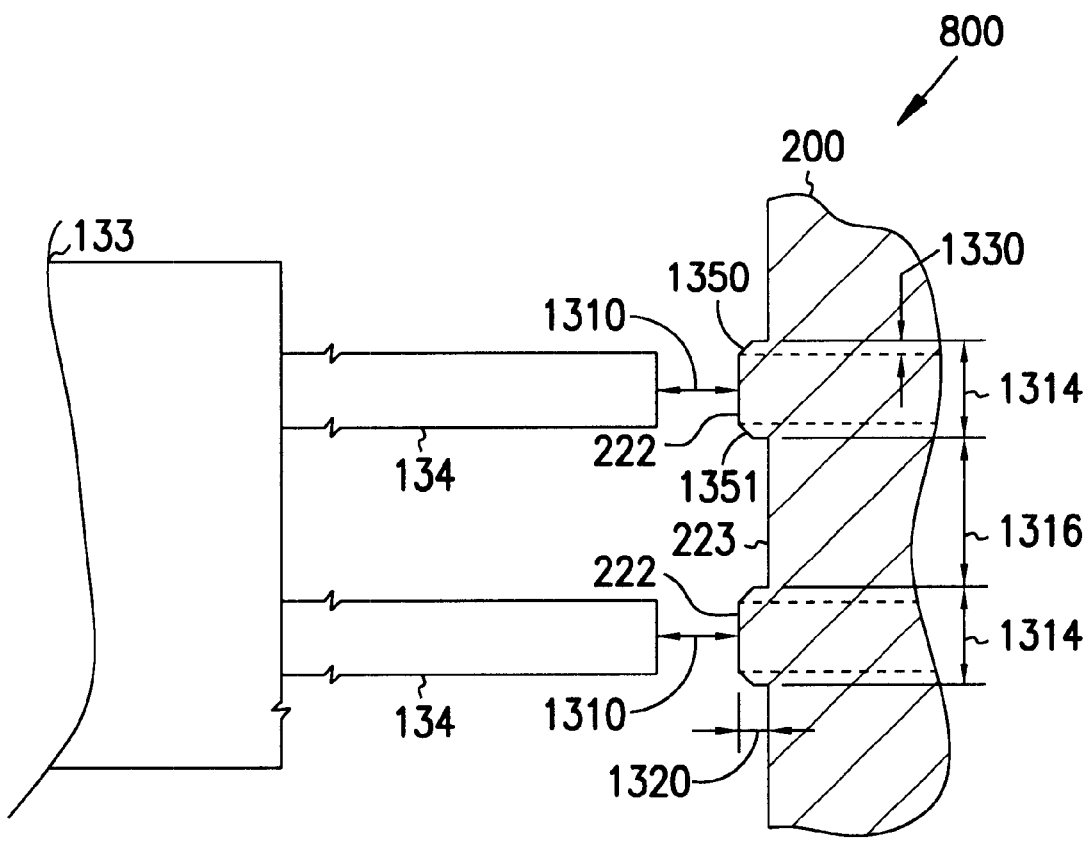
FIG. 13 is an elevation-view diagram showing a portion of discs 134 surrounded by the inside surface of a ribbed shroud 200.

FIG. 13 is an elevational diagram showing a portion of the disc surrounded by the inside surface of another embodiment of a ribbed shroud 200. FIG. 13 illustrates that the raised rib portions do not necessarily have to be substantially rectangularly shaped in cross section and that it may be advantageous to change the shape of the rib portion 222 in order to maximize performance features of the disc drive. In addition to varying the shroud clearance and the raised rib clearance between the shroud 200 and the discs 134 of the disc drive 100, it also may be advantageous to change the shape of the raised rib portion 222. As shown in FIG. 13, the raised rib includes a chamfered edge 1350 and a second chamfered edge 1351. The angle of the chamfer as well as the length of the chamfer edge 1350, 1351 can be changed in order to maximize performance characteristics. For example, a chamfer of approximately 45° is shown in FIG. 13. A shallower angle would produce a lengthened dimension 1330. The height of the raised rib 1320 can also be changed in addition to the spacing between the raised rib 222 and the edge of the discs 134, as depicted by measurement or distance 1310. The inter-rib spacing, as shown by dimension 1316, can also be changed, as well as the height of each rib as depicted by dimension 1314. In addition, it should be noted that the invention contemplates various cross-sectional shapes of raised ribs 222 within the shroud 200. For each different cross-sectional shape of rib 222, it is contemplated that the spacing 1310 between the rib and the discs will be tested to find a point where a performance characteristic will be optimized. It should also be noted that many times, only one performance characteristic may be optimized. For example, one of the performance characteristics that may be optimized is vibration and this can be looked at by noting the number of read errors that occur in a track on the disc surface. For example, by increasing or decreasing the distance 1310 between the raised rib of the shroud and the discs, it may be found that read errors on a particular track may go down to a minimum point. This could also be seen with several different cross-sectional shapes. Furthermore, it may be that the current level associated with rotating the spindle 133 may not necessarily be at a minimum when another performance parameter such as read errors is also at a minimum. In short, the shape of the rib can also be varied and tested in much the same way as described above to minimize selected performance characteristics of the disc drive 100.

CONCLUSIONS

Described above is a method and apparatus for reducing flutter and windage losses in a disc-drive system.

One aspect of the present invention provides a disc-drive system 100 that includes a disc-drive housing 114 and 112, at least one disc 134 mounted within the housing 114 and 112 which rotates, a transducer 150 having a read head 126 positionable to read data from the disc 134, and a shroud structure 200 or 299 near an outer circumference of the disc that reduces flutter and windage losses.

In some embodiments of the disc-drive system, the shroud structure 299 includes a cylindrical section 221 at a substantially constant first radius from an axis of the disc, the cylindrical section 221 spaced about 35 mils from an adjacent disc.

In other embodiments, the shroud structure 200 comprises a cylindrical section 221 having sections 223 at a substantially constant first radius from an axis of the disc, the cylindrical section 221 also having one or more raised circumferential ribs 222 each having a top portion at a substantially constant second radius from the axis of the disc, the second radius being smaller than the first radius.

In some such embodiments, the one or more raised circumferential ribs 222 are substantially rectangular in cross section and each raised rib 222 is positioned adjacent an outer edge of a respective disc 134.

In some embodiments, a raised portion of each rib 222 is positioned adjacent an outer edge of a respective disc 134. In some embodiments, each raised rib 222 is about 10 mils wider than a thickness of the adjacent disc 134. In some embodiments, each raised rib is about 12 mils high.

In some embodiments, each raised rib is spaced about 35 mils from an adjacent disc. In some embodiments, each raised rib is about 10 mils wider than a thickness of an adjacent disc, each raised rib is about 12 mils high, and each raised rib is spaced about 35 mils from an adjacent disc.

The present invention provides a shroud structure 200 for reducing flutter and windage losses in a disc drive 100. The structure 200 includes a cylindrical section at a substantially constant first radius from an axis of the disc 134. The cylindrical section has one or more raised circumferential ribs 222 each having a top portion at a substantially constant second radius from the axis of the disc 134. The second radius is smaller than the first radius. In some embodiments of the shroud structure, the second radius is smaller than the first radius by about 12 mils.

The present invention also provides a method for reducing flutter and windage losses in a disc drive 100. The method includes spacing a first shroud at each one of at least two different spacings from an outer-diameter edge of one or more discs within the disc drive 1110 and measuring a performance characteristic of the disc drive 100 at each one of the at least two different spacings 1112. The shroud spacings is selected based on the performance characteristic measured 1114.

At least one raised rib circumferentially oriented on an inner face of a shroud may be provided 1210.

The raised rib may be positioned opposite an outer-diameter edge a corresponding one of the one or more discs 1212.

Some embodiments the method may include providing a second shroud having at least one raised rib circumferentially oriented on an inner face of the second shroud and having a different height than that of the at least one raised rib of the first shroud. A performance characteristic of the disc drive 100 is measured when fitted with the first shroud and when fitted with the second shroud. One of the rib heights is selected based on the measuring step.

The performance characteristic measured may be disc-motor current or off track read errors.

The present invention provides another method for reducing flutter and windage losses in a disc drive. The method includes forming a ribbed structure that is oriented spaced from and opposite an outer-diameter edge of one or more discs within the disc drive 1210, and orienting one or more ribs of the ribbed structure along a direction of rotation of the one or more discs 1212.

In some embodiments of the second method, the orienting step includes orienting tops of the one or more ribs of the ribbed structure adjacent to and spaced radially from the outer-diameter edge of the one or more discs. The orienting step also includes orienting one or more recesses of the shroud next to the ribs spaced in an axial direction from the outer-diameter edge of the one or more discs.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc-drive system comprising:
    a disc-drive housing;
    a disc mounted within the housing to rotate;
    a transducer having a read head positionable to read data from the disc; and
    a shroud structure spaced at a selected distance from an outer circumference of the disc to reduce flutter and windage losses, the shroud structure further comprising:
        a cylindrical section leaving sections at a substantially constant first radius from an axis of the disc; and one or more raised circumferential ribs, each of said ribs having a top portion at a substantially constant second radius from the axis of the disc, the second radius being smaller than the first radius of the cylindrical section and the radius of the disc being smaller than the second radius.

2. The system according to claim 1, wherein the shroud structure comprises a cylindrical section at a substantially constant first radius from an axis of the disc, the cylindrical section spaced about 35 mils from an adjacent disc.

3. The system according to claim 1, wherein each of the one or more raised circumferential ribs is positioned beyond the radius of the disc.

4. The system according to claim 3, wherein a raised portion of each rib is positioned adjacent an outer edge of a respective disc.

5. The system according to claim 3 wherein each of the one or more raised ribs includes:
    a raised edge near the outer periphery of the disc;
    a first chamerfered edge intesecting the raised edge; and
    a second chamfered edge intersecting the raised edge.

6. The system according to claim 1, wherein the one or more raised circumferential ribs are substantially rectangular in cross section and each raised rib is positioned adjacent an outer edge of a respective disc.

7. A disc-drive system comprising:

a disc-drive housing;

a disc mounted within the housing to rotate;

a transducer having a read head positionable to read data from the disc; and a shroud structure spaced at a selected distance from an outer circumference of the disc to reduce flutter and windage losses, wherein the shroud structure comprises a cylindrical section having sections at a substantially constant first radius from an axis of the disc, the cylindrical section also having one or more raised circumferential ribs each having a top portion at a substantially constant second radius from the axis of the disc, the second radius being smaller than the first radius, wherein each raised rib is about 10 mils wider than a thickness of an adjacent disc.

8. The system according to claim 7, wherein each raised rib is about 12 mils high.

9. The system according to claim 7, wherein each raised rib is spaced about 35 mils from an adjacent disc.

10. The system according to claim 7, wherein each raised rib is about 10 mils wider than a thickness of an adjacent disc, wherein each raised rib is about 12 mils high, and each raised rib is spaced about 35 mils from an adjacent disc.

11. A shroud structure for reducing flutter and windage losses in a disc drive when in assembly with a disc, the structure comprising:

a cylindrical section at a substantially constant first radius from an axis of the disc, the cylindrical section having one or more raised circumferential ribs each having a top portion at a substantially constant second radius from the axis of the disc, the second radius being smaller than the first radius, the second radius being larger than the radius of the disc.

12. A shroud structure for reducing flutter and windage losses in a disc drive when in assembly with a disc, the structure comprising:

a cylindrical section at a substantially constant first radius from an axis of the disc, the cylindrical section having one or more raised circumferential ribs each having a top portion at a substantially constant second radius from the axis of the disc, the second radius being smaller than the first radius by about 12 mils.

13. A method for reducing flutter and windage losses in a disc drive, the method comprising steps of:

(a) spacing a first shroud at each one of at least twp different spacings from an outer-diameter edge of one or more discs within the disc drive;

(b) measuring a performance characteristic of the disc drive at each one of the at least two different spacings;

(c) selecting one of the shroud spacings based on the measuring step (b); and (d) providing at least one raised rib circumferentially oriented on an inner face of the first shroud and positioning the raised rib opposite an outer-diameter edge a corresponding one of the one or more discs.

14. The method according to claim 13, further comprising steps of:

(e) providing a second shroud having at least one raised rib circumferentially oriented on an inner face of the second shroud and having a different height than that of the at least one raised rib of the first shroud;

(f) measuring a performance characteristic of the disc drive when fitted with the first shroud and when fitted with the second shroud; and (g) selecting one of the rib heights based on the measuring step (f).

15. The method according to claim 14, wherein the performance characteristic measured by measuring step (f) is disc-motor current.

* * * * *